Oct. 13, 1931.   R. WASHBURN   1,827,126

HANDLE CONSTRUCTION FOR CULINARY UTENSILS

Filed Aug. 2, 1929

Inventor:
Reginald Washburn,
By Owen W. Kennedy
Attorney

Patented Oct. 13, 1931

1,827,126

UNITED STATES PATENT OFFICE

REGINALD WASHBURN, OF WORCESTER, MASSACHUSETTS, ASSIGNOR TO THE WASHBURN COMPANY, OF WORCESTER, MASSACHUSETTS, A CORPORATION OF MASSACHUSETTS

HANDLE CONSTRUCTION FOR CULINARY UTENSILS

Application filed August 2, 1929. Serial No. 383,096.

The present invention relates to a handle construction for culinary utensils such as strainers, egg beaters, forks, spoons and the like, that are characterized by a metallic shank to which is attached a suitable handle, usually non-metallic, to give an enlarged grip for more convenient use of the utensil.

The object of the invention is to incorporate in the metallic handle carrying portion of the utensil means for preventing the working loose of the metal ferrule which is usually provided at one end of the handle to protect the exposed end of the handle and to give a finished appearance to the utensil. According to the invention, when once the handle has been assembled on the metallic handle carrying portion, it is practically impossible for the metal ferrule to become detached therefrom, thereby eliminating an objection to utensils of this sort, as previously constructed.

In the accompanying drawings—

Like reference characters refer to like parts in the different figures.

Figure 1:
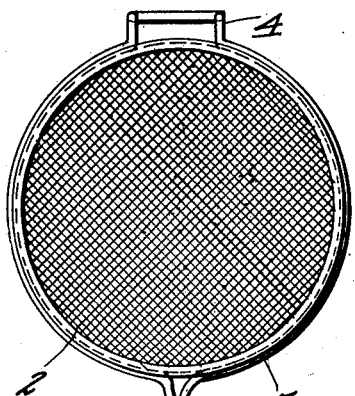
Fig. 1 is a plan view of the utensil embodying the invention.
Figure 2:
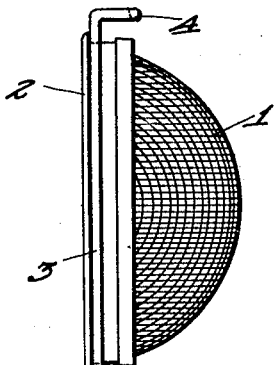
Fig. 2 is a view in side elevation of the utensil shown in Fig. 1.
Figure 3:
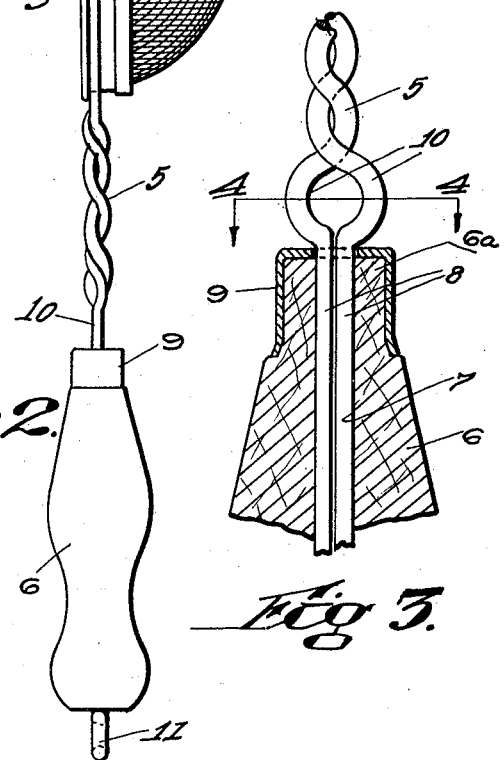
Fig. 3 is an enlarged sectional view of the handle portion of the utensil shown in Fig. 1.
Figure 4:
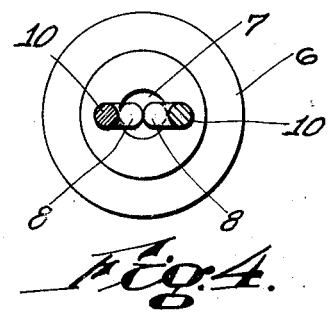
Fig. 4 is a sectional view along the line 4—4 of Fig. 3.

For purposes of illustration, the invention is shown as being incorporated in a strainer providing a bowl 1 attached to a ring 2 around which is bent a wire 3 providing at one side a lug 4 whereby the bowl 1 may be conveniently supported. The opposite ends of the wire 3 are twisted at 5 to form a shank which has sufficient stiffness to serve as a handle for the utensil. In order to provide a convenient and smooth hold for the utensil an enlarged handle 6 composed of any suitable material is mounted on the twisted wire shank 5, the handle 6 providing a central opening 7 for receiving parallel portions 8 of the wire. The inner end of the handle 6 provides a reduced portion 6a which is surrounded by a metal ferrule 9 covering the end of the handle 6 where the wires 8 enter the opening 7 and in order to permanently secure the ferrule 9 to the handle 6, the twisted wire shank portion 5 provides oppositely extending offsets or ears 10 where the wires 8 enter the handle 6.

When the handle 6 is placed on the wire shank, the end of the ferrule 9 abuts the offsets 10, and when the handle 6 is finally secured on the wire shank by bending over the projecting end of one of the straight portions 8 to form an eye 11, it will be impossible for the ferrule 9 to become detached from the handle 6, even when the utensil is subjected to rough usage. Obviously, the offsets 10 on the metallic handle carrying portion, or shank 5 may be of any desired form, so long as they prevent the ferrule 9 from sliding along the shank 5, after it has worked loose from the handle 6. In other words, the ferrule 9 becomes practically an integral part of the utensil when once it is assembled.

I claim:

1. A handle construction for culinary utensils comprising a body supporting wire ring, a stiff shank formed by twisting the wires extending from one side of said ring, oppositely extending offsets in said wires at the end of said twisted shank, and parallel straight wires extending from said offsets for receiving a handle having a metallic ferrule at the end nearest said shank, one of said wires being deflected beyond said handle for holding the end of said ferrule against said offsets to prevent its removal.

2. A handle construction for culinary utensils comprising a body supporting wire ring, a stiff shank formed by twisting the wires extending from one side of said ring, oppositely extending offsets in said wires at the end of the twisted shank, said offsets lying in the same plane, and parallel straight wires extending from said offsets for receiving a handle having a metallic ferrule at the end nearest said shank, one of said wires extending through said handle and being bent into an eye to engage the outer end of said handle and maintain the ferrule in engagement with said offsets.

3. A handle construction for culinary utensils comprising a body supporting wire ring, a stiff shank formed by twisting the wires extending from one side of said ring, oppositely extending offsets in said wires at the end of the twisted shank, parallel closely lying straight wires extending from said offsets, a wooden handle surrounding said straight wires having a metallic ferrule at the end nearest said shank, and means for maintaining said handle on the straight wires with said ferrule in contact with the offsets in said wires.

REGINALD WASHBURN.